(12) United States Patent
Kumar et al.

(10) Patent No.: US 12,132,798 B2
(45) Date of Patent: *Oct. 29, 2024

(54) SYSTEMS AND METHODS FOR ADJUSTING STORAGE BASED ON DETERMINING CONTENT ITEM POPULARITY

(71) Applicant: Rovi Guides, Inc., San Jose, CA (US)

(72) Inventors: Vijay Kumar, Karnataka (IN); Gyanveer Singh, Bangalore (IN); Urvashi Verma, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,956

(22) Filed: Dec. 6, 2023

(65) Prior Publication Data

US 2024/0223670 A1    Jul. 4, 2024

Related U.S. Application Data

(63) Continuation of application No. 17/983,141, filed on Nov. 8, 2022, now Pat. No. 11,888,951, which is a continuation of application No. 16/950,421, filed on Nov. 17, 2020, now Pat. No. 11,522,969.

(51) Int. Cl.
*G06F 15/173* (2006.01)
*H04L 67/306* (2022.01)
*H04L 67/50* (2022.01)
*H04L 67/54* (2022.01)

(52) U.S. Cl.
CPC .......... *H04L 67/535* (2022.05); *H04L 67/306* (2013.01); *H04L 67/54* (2022.05)

(58) Field of Classification Search
None
See application file for complete search history.

(56) References Cited

U.S. PATENT DOCUMENTS

| | | |
|---|---|---|
| 7,761,892 B2 | 7/2010 | Ellis et al. |
| 10,311,362 B1 | 6/2019 | Mirza et al. |
| 11,888,951 B2 | 1/2024 | Kumar et al. |
| 2010/0318484 A1* | 12/2010 | Huberman ............. G06Q 30/02 706/46 |
| 2016/0353144 A1 | 12/2016 | Gopalan |
| 2017/0220926 A1 | 8/2017 | Chhabra et al. |
| 2022/0159086 A1 | 5/2022 | Kumar et al. |
| 2023/0283685 A1 | 9/2023 | Kumar et al. |

* cited by examiner

*Primary Examiner* — Wing F Chan
*Assistant Examiner* — Andrew Woo
(74) *Attorney, Agent, or Firm* — Haley Guiliano LLP

(57) ABSTRACT

Systems and associated methods are described for determining popularity of new content. The system analyzes a content item to identify at least a first and a second attribute associated with the content item. The system also identifies previously posted content items associated with the first and the second attributes. The system then determines levels of user activity associated with the previously posted content item corresponding to the first attribute over a first past time period and associated with the previously posted content item corresponding to the second attribute over a second past time period. The system then extrapolates a levels of user activity for a future time period based on the first past time period and on the second past time period. The system further determines an anticipated level of user activity associated with the content item for the future time period based on the extrapolated levels of user activity.

18 Claims, 8 Drawing Sheets

| 202 | Content Item Identifier | 204a Facebook | 204b Instagram | 204c Snapchat |
|---|---|---|---|---|
| | CID1 | High 206a | Medium 206b | Low 206c |
| | CID2 | Medium 206b | High 206a | Low 206c |
| | CID3 | Low 206c | Medium 206b | High 206a |
| | ... | ... | ... | ... |
| | CIDn | High | Low | Medium |

SYSTEMS AND METHODS FOR ADJUSTING STORAGE BASED ON DETERMINING CONTENT ITEM POPULARITY

CROSS-REFERENCE TO RELATED APPLICATIONS

This application is a continuation of U.S. patent application Ser. No. 17/983,141, filed Nov. 8, 2022, which is a continuation of U.S. patent application Ser. No. 16/950,421, filed Nov. 17, 2020 (now U.S. Pat. No. 11,522,969), the disclosures of each application are incorporated by reference in their entireties.

BACKGROUND

The present disclosure relates to systems and methods for determining content item popularity for content item distribution. In particular, techniques are disclosed for determining eventual popularity of a newly created content item scheduled for distribution and to techniques for adjusting storage of content item based on the determination.

SUMMARY

With the proliferation of content item available today in computing devices, such as smart TVs, laptops, smartphones, tablets, and smart speakers, there has been an increase in the use of content item distribution systems to upload newly created content item to a public domain (e.g., in a way available to other users). In one approach, when new content item is scheduled to be posted (e.g., as when a user tries to post newly created content), a content item distribution system distributes the content item for storage to one or more servers from which the content item is uploaded to one or more social media platforms (e.g., for further distribution to multiple users). One approach to store and distribute new content item is to allow the user to select which new content item to store and when to store the content. The content item distribution system distributes the new content item to store locally or randomly among different servers. However, such an approach is very inefficient since the content item may be stored in a server, which does not have enough network capacity (e.g., bandwidth) to handle all requests for the content, while there is another server with enough capacity to do so, thus resulting in network inefficiency e.g., when too many users request content. In other words, if the content item is predicted to eventually become very popular and the content item is not stored in enough servers, the system may not be able to meet the demand for the content item in the public domain, resulting in poor performance of the system. Thus, there exists a need to predict popularity of the content item in the future and to further determine the appropriate servers and/or social media platforms to upload the content item based on the predicted popularity.

To address these shortcomings, systems and methods are described herein for predicting eventual popularity of newly created content item before posting the content item on the public domain. Systems and methods are also described herein for efficiently storing the newly created content item based on the predicted eventual popularity. Systems and methods are further described herein for recommending applicable platforms on which to post the content item based on the predicted eventual popularity in order for the content item to reach maximum popularity.

In one embodiment, the system determines at least a first attribute and a second different attribute of the newly created content item and checks for previous content item with similar attributes posted across different sharing platforms. The system identifies a first previously posted content item having an attribute similar to the first attribute and determines a first level of user activity corresponding to the first previously posted content item based on a first past time period. The system then extrapolates a second level of user activity for a future time period based on the first past time period. The system also identifies a second previously posted content item having an attribute similar to the second attribute and determines a third level of user activity corresponding to the second previously posted content item over a second past time period. The system then extrapolates a fourth level of user activity for the future time period based on the second past time period. The system further determines an anticipated level of user activity corresponding to the newly created content item for the future time period based on the extrapolated second level of user activity and extrapolated fourth level of user activity.

In some embodiments, the system determines that the anticipated level of user activity corresponding to the newly created content item for the future time period is greater than a threshold level of user activity. The system then stores a copy of the newly created content item at a device where the content item is received and at an additional device such that the newly created content item is available to a plurality of users via the device and via the additional device. The additional device may be different from the device at which the content item was received.

In some embodiments, the system additionally or alternatively identifies a social media platform based on the anticipated level of user activity associated with the newly created content item for the future time period and recommends uploading the content item to the identified social media platform.

Such approaches solves the problem of network inefficiency by storing the content item based on the anticipated level of user activity corresponding to the content item for a future time period. In one example, if the anticipated level of user activity for the future time period of the content item is determined to be high (i.e. greater than threshold), then the content item is stored locally in multiple servers in order to meet the demand of the content item in the public domain. However, if the anticipated level of user activity of the content item is determined to be low (i.e. less than threshold), then the content item may be stored locally in only one server where the content item was received so that other servers may be freed of space to store content item with high anticipated level of user activity. The above approach also recommends the appropriate platform(s) to post the content item based on the anticipated level of user activity for the future time period in order to reach near popularity.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative example of a table structure listing platform popularity associated with the content item in accordance with some embodiments of the disclosure

DETAILED DESCRIPTION

Figure 1:
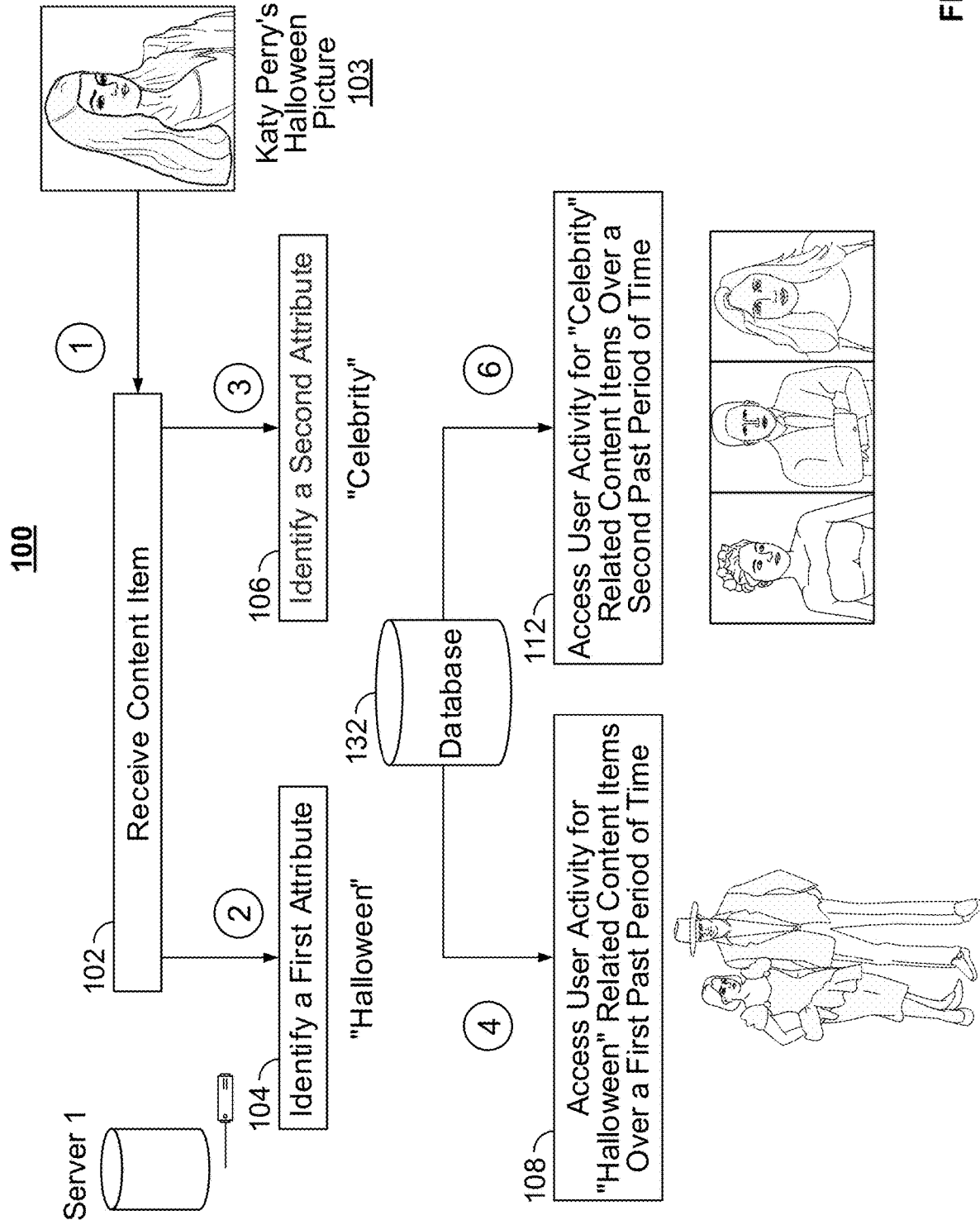
FIG. 1 depicts an illustrative scenario for a content popularity application determining eventual content item popularity in accordance with some embodiments of the disclosure.
Figure 1:
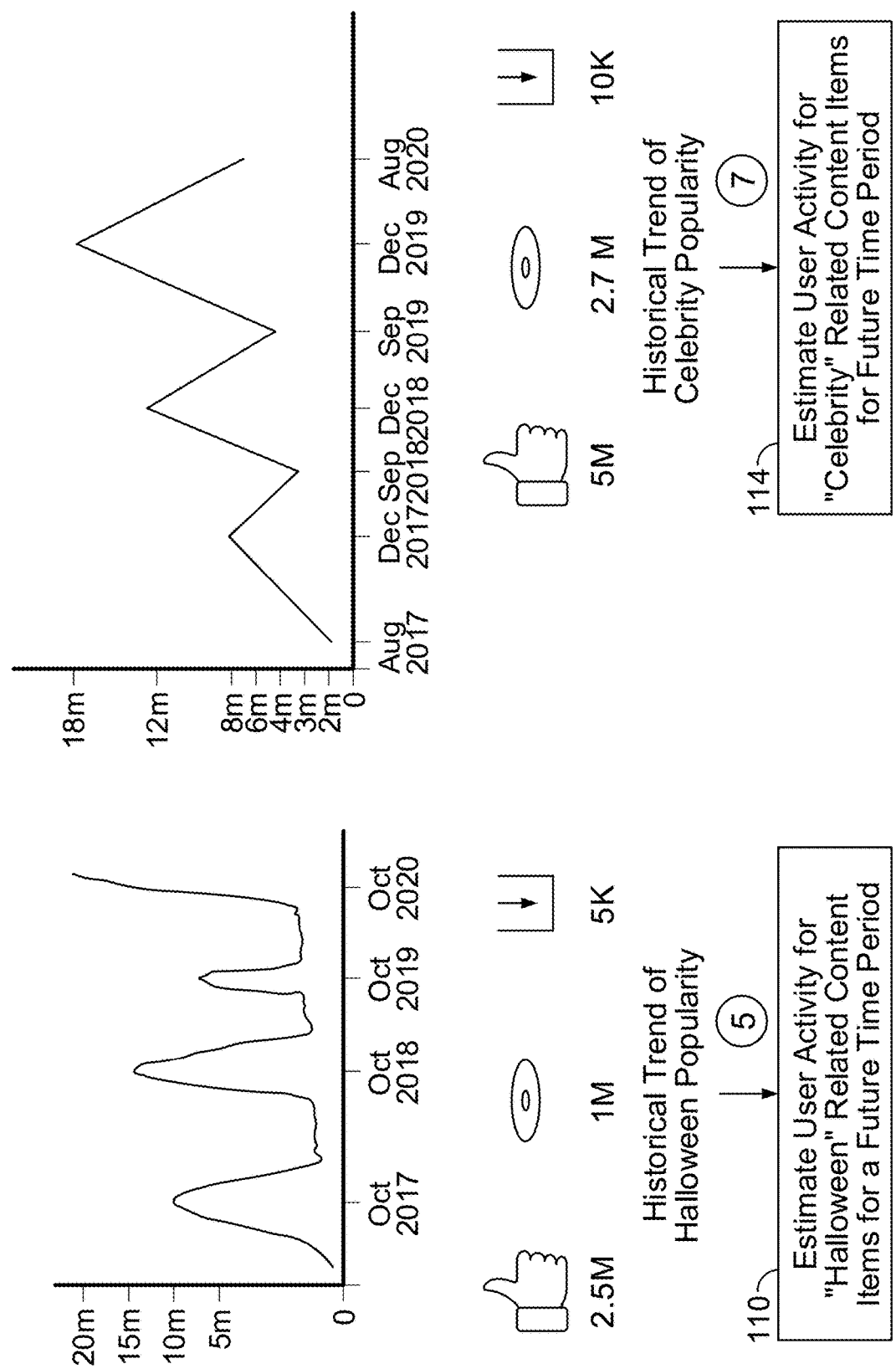
Figure 1:
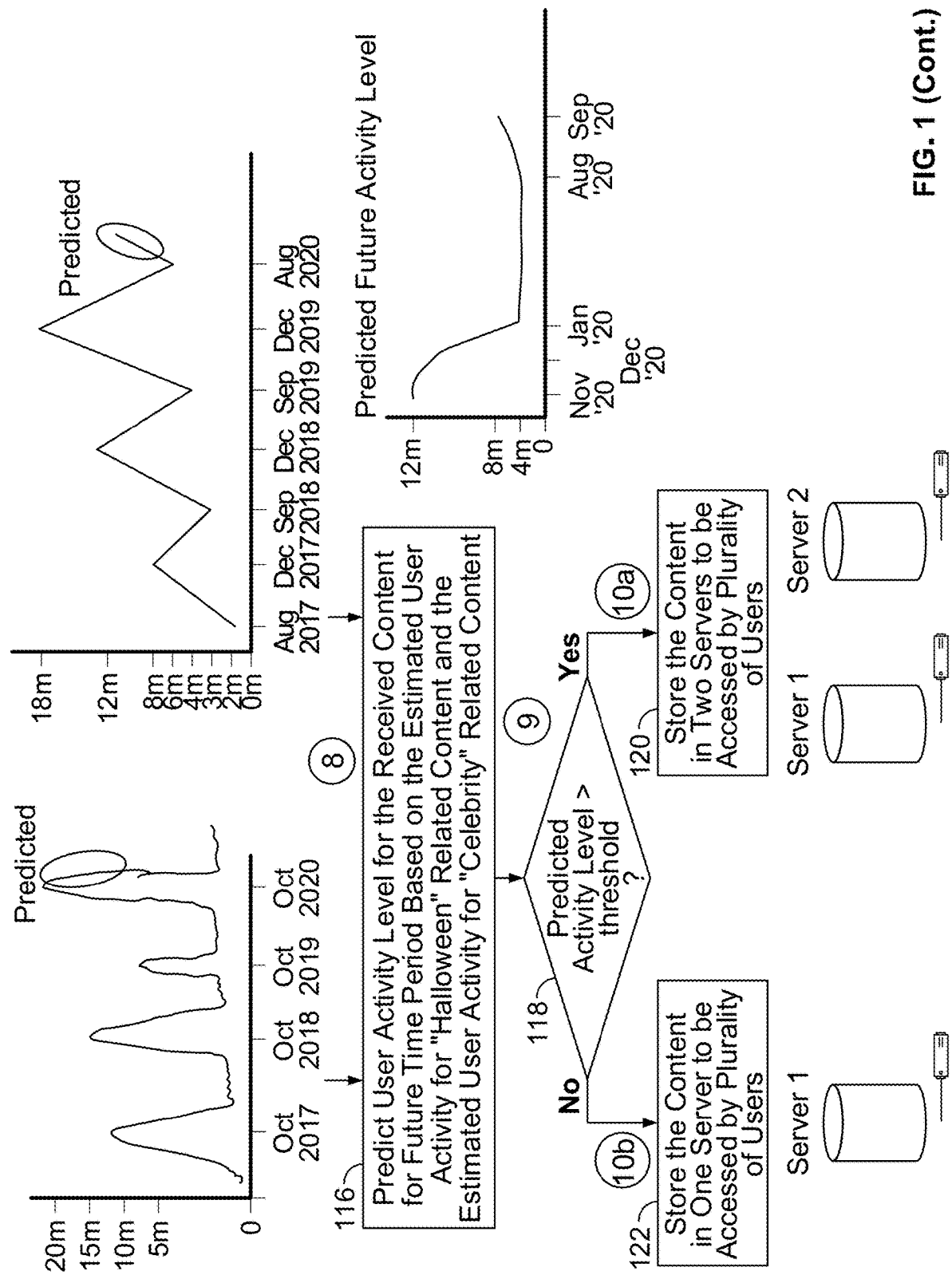

As referred to herein, the term "content" may refer to information that can be categorized and communicated to a user or by a user. For example, content item may comprise media, product, service, news articles, text post, picture, etc. Media content item may refer to any kind of video, audio, text, picture, or multimedia content, or any combination thereof. For example, a media content item may be a blog post, GIFS, memes, animations, photo posts, video posts (e.g., live videos), links, TV show, a movie, a song, a podcast, a video game, any other type of media or any combination thereof. In one embodiment, the content item may be created by a user. The content item may be displayed and/or played back to a user as text, a video, a series of pictures, audio or as a combination of any of these.

In various embodiments described herein, "content item popularity application" is a type of application that provides eventual popularity of a newly created content item for distribution. In some embodiments, the content popularity application may be provided as an on-line application (i.e., provided on a website), or as a stand-alone application on a server, user device, etc. Various devices and platforms that may implement the content popularity application arc described in more detail below. In some embodiments, the content popularity application and/or any instructions for performing any of the embodiments discussed herein may be encoded on computer-readable. Computer-readable includes any capable of storing instructions and/or data. The computer-readable may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, card, register memory, processor caches, Random Access Memory ("RAM"), etc.

In one embodiment, the content popularity application correlates or evaluates current content item with popularity of similar historical content. Thus, for each current content, the content popularity application retrieves historical data/trend about similar content, such as the photo as discussed above, and their respective popularity. The respective popularity is based on number of likes, shares, comments (positive, negative, neutral) including number of comments. In one embodiment, the content popularity application extrapolates popularity of the current content item in the future. In some embodiments, the popularity depends on several attributes. Such attributes include time, popularity of social media platforms, active on social media, country, analyzing of people's connection & behavior on social media and topics of interest. The time factor is a variable that changes with time. For example, the popularity of a sharing platform (e.g., social media platform) has evolved with time. In one example, Facebook in the year 2010 was less popular than Facebook today. With more people joining with time, the time factor drives popularity. Thus, an absolute value may be used for the time variable. The popularity of social media platform factor is a variable that depends on the content. For example, a Facebook could be more popular than an Instagram, LinkedIn or a Snapchat for posting a personal picture. Thus, Facebook may be assigned with more points on absolute terms than another social media platforms for posting personal pictures. The active on social media is a factor is a variable that depends on how active a user's connection is on social media platform or any pattern of the user's activity on the social media platform. The country is a factor that includes any countries that are barred from one or more social media platforms. For example, Facebook is barred from China, but Snapchat is still permitted in China, thus Facebook has a very low popularity in China, yet Snapchat has a high popularity in China. Analyzing people' connection and their behavior on social media platform is a factor that is used to determine the popularity of the content. Some examples of the behavior include views, download, likes, dislikes, shares, comments of user's connection on social media platform would determine what kind of content item are being liked, disliked, shared and commented on by user's connection to predict popularity of the current content. The topics of general interest include current affairs (e.g., royal wedding in UK gets attention or pictures of princess Diana gets attention) or other trending news/events (e.g., Oscars, Emmy etc.) In one embodiment, the content popularity application predicts popularity index for the current content. The popularity index includes a close range of number of likes, shares or comments (positive, negative or neutral) that the current content item would receive. In one embodiment, the popularity index is a global popularity index applicable to all the social media platforms. In one embodiment, the popularity index is a local popularity index specific to a social media platform. In some embodiments, the content item plurality platform identifies a social media platform among the social media platforms to recommend sharing the current content.

FIG. 1 shows an exemplary operation of the content item popularity application. In some embodiments, the content popularity application may be executing on a server, or a client or combination of the server and the client of an OTT (over-the-top) media streaming application content item provider (e.g., Facebook, Instagram, Snapchat, YouTube, Pandora, NetFlix,) that is determining an eventual popularity of a social media content. Some examples of the popularity of the social media content item include number of views, number of downloads, number of likes, number of dislikes, number of shares, number of comments etc. In another example, the content popularity application s executing on a media device of a user. In another example, the content popularity application is executing on equipment of a cable company.

In some embodiments, at step 102, the content popularity application may receive a content item (e.g., social media content item) 103. In one embodiment, the content item 103 is posted on a network to be available to other users. In one example, the content item is posted by a user via a user device. In one embodiment, content item 103 is retrieved from the user device. In one embodiment, the content item 103 is received by a server (e.g., Server 1). As shown, in one example, the content item 103 is an image of a celebrity, "Kate Perry in a Halloween costume." At step 104, the content popularity application identifies a first attribute of the content item. In some embodiments, the first attribute includes a first category of the content item. In one embodiment, the content popularity application determines the first attribute based on metadata associated with the content item. The metadata may include but is not limited to people, genre, activities, characters, locations, sports, events, holidays, celebrations, activities, occupations, etc. In one example, the metadata is provided by the user. For example, the user may tag the content item as "Kate Perry in a Halloween costume." In one embodiment, the content popularity application determines the first attribute of the content item 103 based on visual procession of the content item (e.g., visual item recognition). The visual content item may include but not limited to pictures, videos, screenshots, memes, slide decks, graphics, diagrams, charts etc. In one example, the first attribute is "Halloween." At step 106, the content popularity application identifies a second attribute of the content item. In some embodiments, the second attribute includes a second category of the content item. In one embodiment, the content popularity application determines the second attribute based on the metadata associated with the content item. In one embodiment, the content popularity application determines the second attribute of the content item based on the visual content item associated with the content item. In one example, the second attribute is "Celebrity."

In one embodiment, the content popularity application analyzes content item over a period of time (e.g., last ten years) to determine or more attributes present in the content item. In one example, the content item includes a photo of people. The content popularity application may analyze the photo to determine whether the photo contains a group of people or individual. If the photo contains an individual, the content popularity application may also analyze the photo to determine whether the individual is an adult, child, middle age, young old age. The content popularity application may analyze the photo to determine whether the individual or the group of people in the photo are famous personalities or ordinary person. The content popularity application may analyze the photo to determine occupation of the people in the photo. Some examples of the occupation include film actor, fashion model, engineer, scientist, researcher, doctor, teacher sports player. The content popularity application may further analyze the photo to determine whether the individual is a male or female. The content popularity application may further analyze the looks of the individual or the group of people in the photo to determine whether they are attractive or appealing (e.g., well built, heavy, handsome, pretty etc.). The content popularity application may further analyze the photo to determine dressing sense (e.g., ordinarily dressed, fashionably dressed) of the individual or the group of people. The content popularity application may further analyze the photo to determine whether the individual or any of the group of people wear glasses and type of glasses (e.g., eyeglasses, sunglasses etc.). The content popularity application may further analyze the photo to determine genre of the individual or the group of people. The content popularity application may further analyze the photo to determine characters of the individual or the group of people. The content popularity application may further analyze the photo to determine number of people in the group connected on the social media platforms. The content popularity application may further analyze to determine whether the individual or the group of people are involved in some activity (dance, comedy, sports) or an event (e.g., birthday, wedding, sport tournaments, charity, etc.). In one example, it is determined that the event is a theme event (e.g., independence day, veteran's day etc.). The content popularity application may also analyze the photo to determine location (e.g., scenic, non-scenic, domestic, international) etc. In one example the location is the location of the activity or the event. The content popularity application may also analyze the location to determine that the social media is barred in a country such as China.

In one embodiment, the content popularity application correlates or evaluates content item in the received content item with popularity of similar historical content. Thus, for each current content, the content popularity application retrieves historical data/trend about similar content, such as the photo as discussed above, and their respective popularity. The respective popularity is based on number of likes, shares, comments (positive, negative, neutral) including number of comments.

At step 108, the content popularity application accesses user activity for "Halloween" related content items over a first past period of time. In one example, the user activity includes number of views, downloads, likes, shares, dislikes, shares, ratings and comments (e.g., positive, negative, neutral) etc. In one embodiment, database 132 includes a plurality of content items and corresponding user activity. In one embodiment, the content popularity application accesses the database 132 to search for content item(s) among the plurality of content items that match with "Halloween" content. The content popularity application identifies one or more content items among the plurality of content items associated with "Halloween" content item and corresponding user activity. In one embodiment, the content popularity application determines historical trend of Halloween related content item popularity based on the user activity of the previously posted Halloween content items over the first past period of time. In one example, the content popularity application may determine the user activity for previously posted Halloween content items during the years 2017, 2018, 2019 and 2020. The user activity data may then be converted into predictive data using one or more of several techniques such as regression, rate of change, curve fit, function fit, etc. In one example, the content popularity application may determine a rate of change in the user activity over the first past period of time for previously posted Halloween content items. For example, the content popularity application may determine that user activity level for the previously posted Halloween content items is maximum during the months of October in the years 2017, 2018, 2019 and 2020 with maximum number of and downloads and that user activity level for the previously posted Halloween content item s is minimum during other months with minimum number of downloads as shown in the periodic function in the graph corresponding to the Halloween related content. In one example, increase in the user activity level may vary during each of the years for the previously posted Halloween content items. For example, as shown in chart of step 108 with respect to the previously posted Halloween content items, in October there were 10 million downloads in October 2017, there were 15 million downloads, in October 2019, there were 8 million downloads and 20 million downloads in October 2020. In one example, a download threshold for Halloween related content item during the months of October is 5 million. In example, the user activity level for the previously posted Halloween content items in the months of January to August is generally quite low with user activity level increasing during the month of September and then slowly dropping from the month of November onwards. In one example with respect to the number of downloads of previously posted Halloween items, in the months of January to August of 2017, are in the range of 1 million to 1.3 million, in the range of 5 million to 6 million in the month of September and then there is a spike of 10 million downloads in October and in the range of 2 to 3 million in the months of November and December. Such an example is illustrated as periodic function in the graph corresponding to the Halloween related content. In one embodiment, the content popularity application may also determine the user activity at the end of the first past period of time. For example, the content popularity application may determine that the user activity going to increase during the month of October in the year 2020. At step 110, the content popularity application estimates user activity for Halloween related content items for a future time period. In one embodiment, the content popularity application estimates the user activity for Halloween related content item for the future time period based on the historical trend of Halloween popularity. In one example, the content popularity application estimates that level of the user activity for the "Halloween" related content item will decrease after the month of October 2020. For example, the content popularity application estimates a decrease from 20 million downloads in October 2020 to a range of 5 to 6 million in November 2020 and down to range of 4 to 5 million downloads in December 2020 and continuously drop down in the range of 1 to 2 million in the months of January to August 2021.

At step 112, the content popularity application accesses user activity for "Celebrity" related content items over a second past period of time. In one example, the user activity includes number of views, downloads, likes, shares, dislikes, shares, ratings and comments (e.g., positive, negative, neutral) etc. In one embodiment, the content item population application accesses the database 132 to search for content item(s) among the plurality of content items and corresponding user activity. In one embodiment, the content popularity application accesses the database 132 to search for content item(s) among the plurality of content items that match with "Celebrity" content. The content popularity application identifies one or more content items among the plurality of content items associated with "Celebrity" and corresponding user activity. In one embodiment, the content popularity application determines historical trend of Celebrity related content item popularity based on the user activity of the previously posted Halloween content items over the second past period of time. In one example, the content popularity application may determine level of user activity for previously posted celebrity content items during the years 2017, 2018, 2019 and 2020. In one embodiment, the content popularity application may determine a rate of change in the user activity level over the second past period of time for previously posted Halloween content items. In one example, the content popularity application may determine number of downloads with respect to previously posted celebrity content items. For example, as shown in chart of step 112, the number for downloads for the previously posted celebrity content item s increase from 2 million to 8 million from August 2017 to December 2017, decrease from 8 million to 3 million from January 2018 to September of 2018, then increase from 3 million to 12 million from October 2018 to December 2018, then again decrease from 12 million to about 4 million from January 2019 to September 2019 and then increase sharply from 4 million to 18 million from October 2019 until December 2019 and then decrease from 18 million to 6 million January 2020 to August 2020. Such an example is illustrated as function in the graph corresponding to the Celebrity related content item. In one embodiment, the content popularity application may also determine the user activity at the end of the second past period of time. For example, the content popularity application determines that the user activity has recently increased during the month of September in the year 2020. At step 114, the content popularity application estimates user activity for celebrity related content items for the future time period. In one embodiment, the content popularity application estimates the user activity for Celebrity related content item for the future time period based on the historical trend of Celebrity popularity. In one example, the content popularity application estimates that the user activity for the "Celebrity" related content item will continue to increase during the month of October 2020 till at least the month of December 2020.

In one embodiment, the content popularity application extrapolates future popularity of the received content item (e.g., based on predictive data derived in steps 110 and 114). In some embodiments, the popularity depends on several factors. Such factors include time, popularity of social media platforms, active on social media, country, analyzing of people's connection & behavior on social media and topics of interest. At step 116, the content popularity application predicts user activity level (e.g., views or download) for the received content item for future time period based on the estimated user activity for the "Halloween" related content item and the estimated user activity for the "Celebrity" related content. In one example, the content popularity application predicts a large increase in the user activity level for the content item 103 during the month of October 2020 based on both the estimated user activity level for Halloween related content item and for the Celebrity related content. In one embodiment, the content popularity application uses the user activity level estimated to be consistently high for the Halloween related content item during the months of October in the year 2017, 2018 and 2019 to predict the increase in content item 103 during October 2020. In one embodiment, the content popularity application uses the recent user activity level, i.e. increase in September 2020 for Celebrity related content item to predict the increase in content item 103 during October 2020. The graph of the predicted user activity level shows a high peak (i.e. maximum level of user activity) during the month of October 2020. For example, the number of downloads for the received content item is predicted to be 20 million in the month of October 2020. In one embodiment, the content item popularity predicts the content item 103 for October 2020 based on the estimated user activity level for Celebrity related content item in the years 2017, 2018 and 2019 since In one example, the content popularity application predicts a slight increase in the user activity level for the content item 103 during the months of November and December of 2020 since the user activity level for the Halloween related content item is estimated to decrease after October 2020 yet the user activity for the Celebrity related content item is estimated to continue to increase during the months of November and December 2020 as shown in the graph of the predicted user activity level in the future of the content item. For example, the number of number of downloads for the received content item is predicted to be 12 million in the months of November and December 2020. In one example, the content popularity application predicts a decrease in the user activity level for the content item 103 from January 2021 to July 2021 since the user activity level is estimated to decrease for both the Halloween related content item and the Celebrity content item from January 2021 to August 2021. For example, the number of downloads for the received content item is predicted to be 4 million in the months of January 2021 to August 2021 as shown in the graph of the predicted user activity level in the future of the content item. In one example, the number of downloads for the received content item is predicted to be 8 million in the month of September.

At step 118, the content popularity application determines whether the predicted user activity level is greater than threshold. In one example, a threshold is based on number of user activity level such as number of views, number of downloads, number of likes, number of shares, or number of comments or any combination of two or more of such activity level. In one example, threshold is based on number of types of comments such as positive or negative comments. For example, the threshold for number of downloads is 5 million downloads. If at step 118, it is determined that the predicted user activity level is greater than the threshold, then at step 120, the content item is stored in two or more separate servers (e.g., server 1, server 2). In one example, copy of the content item 103 is stored separately in server 1 and server 2 of a content item distribution network (CDN). Thus, by storing the content item in two or more servers of the CDN, the content item is distributed spatially relative to end users. If at step 118, it is determined that the predicted user activity level is less than the threshold, then at step 122, the content item is stored only in one server (e.g., server 1). In one example, copy of the content item 103 is stored in server 1. In one example, the content item 103 is received in August 2021. In one embodiment, the content popularity application initially stores the content item in server 1 since the predicted trajectory of number of downloads is 4 million which is less than the threshold number of 5 million downloads but during September (8 million predicted downloads) and approaching October (20 million predicted downloads), the content popularity application automatically sends the content item to CDN servers (servers 1 and 2) since the predicted number of downloads during these months are greater than the threshold of 5 million.

Some attributes that may significantly impact popularity include filter (m), genre (n), speed (p), embed background music (q) and element of unexpectedness (u). In one embodiment, the content popularity application recommends some options using the one or more of the attributes to modify the content item using the attributes to increase popularity of the content item. One option includes using the filter, which is a design overlay that can be added on top of the content item in order to enhance the appearance of content item on the content item. For example, a beauty filter in Snapchat. Another option includes using the genre, which is a type of content item on the content item. In one embodiment, multiple combination of genre affects popularity of the content item. For example, a combination of pop and rap music is very much liked by many users in social media. Another option includes using the speed of the content item in the content item. For example, frames of a video content item moving at a combination of slow and normal speed as per scene in the video content item impacts popularity of the content item. In one example, if the scene is an old movie in which two lovers meet after 10 years, such scene may be edited to include a mix of slow and normal motion to increase the surprise motion and suspense element in order to increase attention of the audience. Another option includes using the embed background music, which includes music playing in the background of the content item. Such background music engages the audience attention on the content item in the content item. A further option includes using the element of unexpectedness, which is a surprise element in the content item. In one example, a surprise element may be a child crawling or a cute dog coming into a video frame of a user participating in formal company video conferencing live meeting. In another example, a surprise element is posting a picture of Angeline Jolie shown as present at a friend's birthday party.

In some embodiments, the content popularity application predicts popularity of a content item based on the popularity attributes. In one embodiment, the content popularity application uses an algorithm to predict popularity as shown in table 1 below:

TABLE 1

| Content item Attributes | Historic Value | Weight | Popularity metric |
|---|---|---|---|
| Filter | m | 4 | 4m |
| Genre | n | 3 | 3n |
| Speed | p | 2 | 2q |
| Embed Background Music | q | 3 | 3u |
| Unexpected | u | 7 | 73 |

In one example, value of the initial popularity of the content item is assigned as 1. The historic values of each of the content item attributes are assigned with m, n, p, q and u for each of the attributes filter, genre, speed, embed background music and unexpected respectively. A weight value is assigned to each of the popularity attributes. As in the table above, in one example, a weight value of 4 is assigned to the filter, weight value of 3 is assigned to the genre, weight value of 2 is assigned to speed p, a weight value of 3 is assigned to embed background music and a weight value of 7 is assigned to unexpectedness. Accordingly, popularity component for the filter is 4m, for the genre is 3n, for the speed is 2p, for the embed background music is 3q and for the unexpectedness is 7u. Thus, the popularity factor for the content item is determined to be added combinations of the popularity components, resulting in 4m+3n+2p+3q+7u In some embodiments, the content popularity application recommends to the user device from which the content item was received, to upload the content item on one or more sharing platforms. In one embodiment, the sharing platform is a social media platform. In one embodiment, the content popularity application may determine a number of sharing platforms to upload the content item based on the determination whether the anticipated level of user activity is greater than the threshold. As discussed above, in one example, the threshold is 5 million downloads. For example, when the anticipated level of user activity is determined to greater than the threshold, the content popularity application may recommend to the user device to upload the content item in multiple sharing platforms. In one example, when the number of downloads is 8 million (i.e. greater than the threshold value of 5 million), the content popularity application may recommend to post the content item on two sharing platforms (e.g., Facebook & Instagram) In one example, when the number of downloads is 20 million (i.e. greater than the threshold value of 5 million), the content popularity application may recommend to post the content item on at least four sharing platforms (e.g., Facebook, Instagram, YouTube, Snap Chat). When the anticipated level of user activity is determined to be less than the threshold, the content popularity application may recommend to the user device to upload the content item in only one sharing platform. In one example, when the number of downloads is 4 million (i.e. less than the threshold value of 5 million), the content popularity application may recommend posting the content item on only one sharing platform (e.g., Facebook).

In some embodiments, the content popularity application may suggest to the user device to edit or modify the content item based on the predicted user activity level for the received content item for future time period. In one embodiment, the content popularity application may suggest to the user device to edit or modify the content item prior to uploading the content item on one or more sharing platforms. In one embodiment, the content popularity application may suggest editing the content item to increase the popularity of the content item.

In some embodiments, the content popularity application identifies a sharing platform among a plurality of sharing platforms based on the predicted user activity level for the received content item for future time period. In one embodiment, the sharing platform is a social media platform. Some examples of social media platforms include Facebook, YouTube, Instagram, LinkedIn, Snapchat etc. In one embodiment, the content popularity application ranks the popularity of the content item on each of the plurality of sharing platforms based on the predicted user activity level for the received content item for future time period. In one example, the popularity of the content item is ranked on each of the sharing platforms based on anticipated number of likes, comments and shares to occur in the future time period on each of the sharing platforms. In one embodiment, the content popularity application identifies the sharing platform to upload the content item based on the ranking popularity of the content item in its respective sharing platform as described in greater detail below.

As discussed above, the popularity depends on several attributes. Such attributes include time, popularity of social media platforms, active on social media, country, analyzing of people's connection & behavior on social media and topics of interest. The time factor is a variable that changes with time. For example, the popularity of a sharing platform (e.g., social media platform) has evolved with time. In one example, Facebook in the year 2010 was less popular than Facebook today. With more people joining with time, the time factor drives popularity. Thus, an absolute value may be used for the time variable. The popularity of social media platform factor is a variable that depends on the content. For example, a Facebook could be more popular than an Instagram, LinkedIn or a Snapchat for posting a personal picture. Thus, Facebook may be assigned with more points on absolute terms than another social media platforms for posting personal pictures. The active on social media is a factor is a variable that depends on how active a user's connection is on social media platform or any pattern of the user's activity on the social media platform. The country is a factor that includes any countries that are barred from one or more social media platforms. For example, Facebook is barred from China, but Snapchat is still permitted in China, thus Facebook has a very low popularity in China, yet Snapchat has a high popularity in China. Analyzing people' connection and their behavior on social media platform is a factor that is used to determine the popularity of the content. Some examples of the behavior include views, downloads, likes, dislikes, shares, comments of user's connection on social media platform would determine what kind of content item are being viewed, downloaded, liked, disliked, shared and commented on by user's connection to predict popularity of the current content. The topics of general interest include current affairs (e.g., royal wedding in UK gets attention or pictures of princess Diana gets attention) or other trending news/events (e.g., Oscars, Emmy etc.) In one embodiment, the content popularity application predicts popularity index for the current content. The popularity index includes a close range of number of likes, shares or comments (positive, negative or neutral) that the current content item would receive. In one embodiment, the popularity index is a global popularity index applicable to all the social media platforms. In one embodiment, the popularity index is a local popularity index specific to a social media platform. Accordingly, the content item plurality application identifies a social media platform among the social media platforms to recommend sharing the current received content item.

FIG. 2 shows an illustrative example of a table structure 200 listing content item identifiers 202 identifying the respective received content item, social media platform identifiers 204 (e.g., Facebook 204a Instagram 204b and Snapchat 204c) identifying each of the social media platforms. The table structure 200 also includes ranking 206 (e.g., high, medium and low) of the content item identifiers 202 corresponding to the respective received content item for future time period on each of the social media platforms represented by the respective social media platform identifiers 204. In one embodiment, the ranking is based on users' behaviors, which include views, downloads, likes, dislikes, shares, comments of user's connection on social media platform would determine what kind of content item are being viewed, downloaded, liked, disliked, shared and commented on by user's connection to predict popularity of the current content. For example, high ranking includes downloads of at least 10 million and above of the content item. The medium ranking of the content item includes downloads in the range of 5 million to 10 million of the content item. The low ranking of the content item includes downloads of less than 5 million of the content item. The content item identifiers 202 include CD1 to CDn. In one example a content item identifier 202 for the content item including an image of "Kate Perry in Halloween Costume" is CD1. The popularity ranking corresponding to CID1 includes a rank High 206a in Facebook 204a, rank Medium 206b in Instagram 204b and rank Low 206c in Snapchat 204c. Thus, the content item including the image of "Kate Perry in Halloween Costume" is predicted to be highly popular in Facebook in the future and anticipated to receive maximum number of likes, shares and comments. The content item including the image of "Kate Perry in Halloween Costume" is predicted to be not that highly popular in Instagram in the future and is anticipated to receive medium number of lines, shares and comments. The content item including the image of "Kate Perry in Halloween Costume" is predicted to be very low in popularity in Snapchat in the future and anticipated to receive minimum number of lines, shares and comments. In one embodiment, the content popularity application identifies Facebook 204a as the social media platform to upload the content item "Kate Perry in Halloween Costume." corresponding to the CID1. The content popularity application may recommend to the user device to upload the content item "Kate Perry in Halloween Costume" corresponding to the CID1 to Facebook 204a. Another example of a content item identifier 202b is "CID2" for a content item including a video of "Master Chef cuisine." The popularity ranking corresponding to CID2 includes the rank medium 206b in Facebook 204a, the rank high 206a in Instagram 204b and rank Low 206c in Snapchat 204c. In one embodiment, the content popularity application identifies Instagram 204b as the social media platform to upload the content item "Master Chef cuisine" corresponding to the CID2. The content popularity application may recommend to the user device to upload the content item "Master Chef cuisine" corresponding to the CID2 in Instagram 204*b*. A further example of a content item identifier 202*c* is "CID3" for a content item including an image of "Taco Bell Special Lunch menu." The popularity ranking corresponding to CID includes the rank low 206*c* in Facebook 204*a*, the rank medium 206*b* in Instagram 204*b* and the rank high 206*a* in Snapchat 204*c*. In one embodiment, the content popularity application identifies "Snapchat" 204*c* as the social media platform to upload the content item "Taco Bell Special Lunch menu" corresponding to the CID3 in the Snapchat 204*c*. The content popularity application may recommend to the user device to upload the content item "Taco Bell Special Lunch menu" corresponding to the CID3 in the Snapchat 204*c*.

In some embodiments the content popularity application identifies two or more social media platforms to upload the content item. In some embodiments, the content popularity application recommends to the user device to upload the content item on the two or more social media platforms. For example, the content popularity application identifies both Facebook 204*a* and Instagram 204*b* to upload the content item "Kate Perry in Halloween Costume" corresponding to the CID1. The content popularity application may recommend to the user device to upload the content item content item "Kate Perry in Halloween Costume" corresponding to CID1 onto both Facebook 204*a* and Instagram 20*b*.

Figure 3:
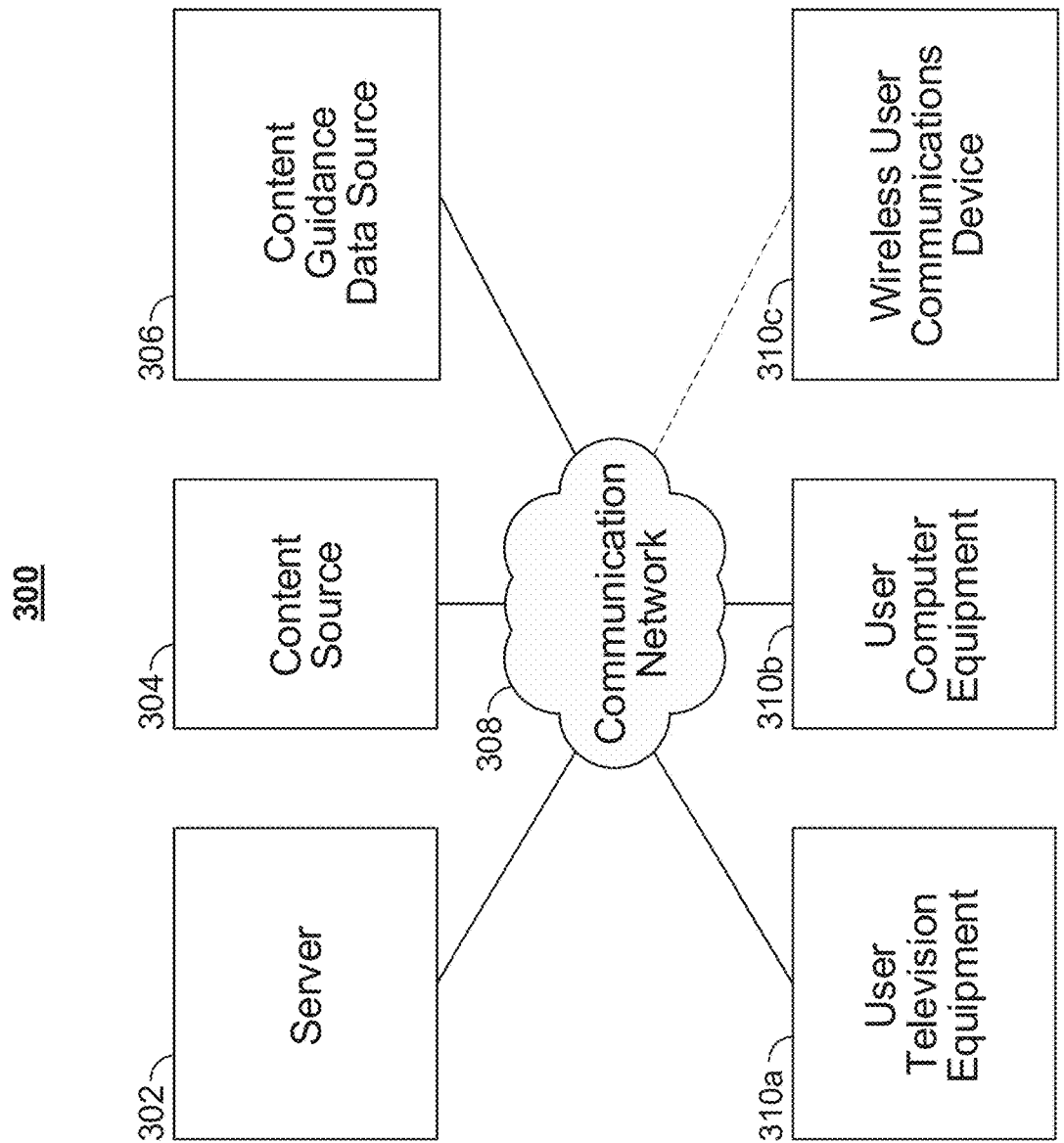
FIG. 3 shows an illustrative block diagram of a system hosting a content item delivery application, in accordance with some embodiments of the disclosure.

FIG. 3 shows an illustrative block diagram of a system 300 for displaying content item based on content item recommendation, in accordance with some embodiments of the disclosure. In various aspects, system 300 includes one or more of server 302, content item source 304, content item guidance data source 306, communication network 308, and one or more computing devices 310, such as user television equipment 310*a* (e.g., a set-top box), user computer equipment 310*b* (e.g., a laptop), and/or wireless user communications device 310*c* (e.g., a smartphone device). Although FIG. 3 shows one of each component, in various examples, system 300 may include fewer than the illustrated components and/or multiples of one or more illustrated components. Communication network 308 may be any type of communication network, such as the Internet, a mobile phone network, mobile voice or data network (e.g., a 4G or LTE network), cable network, public switched telephone network, or any combination of two or more of such communication networks. Communication network 308 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 308 communicatively couples various components of system 300 to one another. For instance, server 302 may be communicatively coupled to content item source 304, content item guidance data source 306, and/or computing device 310 via communication network 308.

In some examples, content item source 304 and content item guidance data source 306 may be integrated as one device. Content item source 304 may include one or more types of content item distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content item providers. NBC is a trademark owned by the National Broadcasting Company, Inc.; ABC is a trademark owned by the American Broadcasting Company, Inc.; and HBO is a trademark owned by the Home Box Office, Inc. Content item source 304 may be the originator of content item (e.g., a television broadcaster, a Webcast provider, etc.) or may not be the originator of content item (e.g., an on-demand content item provider, an Internet provider of content item of broadcast programs for downloading, etc.). Content item source 304 may include cable sources, satellite providers, on-demand providers, Internet providers, over-the-top content item providers, or other providers of content. Content item source 304 may also include a remote media server used to store different types of content item (e.g., including video content item selected by a user) in a location remote from computing device 310. Systems and methods for remote storage of content item and providing remotely stored content item to user equipment are discussed in greater detail in connection with Ellis et al., U.S. Pat. No. 7,761,892, issued Jul. 20, 2010, which is hereby incorporated by reference herein in its entirety.

Content item source 304 and content item guidance data source 306 may provide content item and/or content item guidance data to computing device 310 and/or server 302 using any suitable approach. In some embodiments, content item guidance data source 306 may provide a stand-alone interactive television program guide that receives program guide data via a data feed (e.g., a continuous feed or trickle feed). In some examples, content item guidance data source 306 may provide program schedule data and other guidance data to computing device 310 on a television channel sideband, using an in-band digital signal, an out-of-band digital signal, or any other suitable data transmission technique.

As described in further detail below, server 302 manages the communication of a live content item stream (e.g., a live sporting event broadcast, a live news broadcast, or the like) and recorded streams from content item source 304 to computing device 310 via communication network 308. For instance, in some embodiments, content item from content item source 304 and/or guidance data from content item guidance data source 306 may be provided to computing device 310 using a client/server approach. In such examples, computing device 310 may pull content item and/or content item guidance data from server 302 and/or server 302 may push content item and/or content item guidance data to computing device 310. In some embodiments, a client application residing on computing device 310 may initiate sessions with server 302, content item source 304, and/or content item guidance data source 306 to obtain content item and/or guidance data when needed, e.g., when the guidance data is out of date or when computing device 310 receives a request from the user to receive content item or guidance data. In various aspects, server 302 may also be configured to detect events within the live content item stream and, based on the detected events, control the display of content item and/or navigation menu options via computing device 310. Additionally, although FIG. 3 shows content item source 304 and content item guidance data source 306 as separate from server 302, in some embodiments, content item source 304 and/or content item guidance data source 306 may be integrated as one device with server 302.

Content item and/or content item guidance data delivered to computing device 310 may be over-the-top (OTT) content. OTT content item delivery allows Internet-enabled user devices, such as computing device 310, to receive content item that is transferred over the Internet, including any content item described above, in addition to content item received over cable or satellite connections. OTT content item is delivered via an Internet connection provided by an Internet service provider (ISP), but a third party distributes the content. The ISP may not be responsible for the viewing abilities, copyrights, or redistribution of the content, and may transfer only IP packets provided by the OTT content item provider. Examples of OTT content item providers include FACEBOOK, AMAZON, YOUTUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content item providers may also include any other OTT content item provider. OTT content item providers may additionally or alternatively provide content item guidance data described above. In addition to content item and/or content item guidance data, providers of OTT content item can distribute applications (e.g., web-based applications or cloud-based applications), or the content item can be displayed by applications stored on computing device 310.

Figure 4:
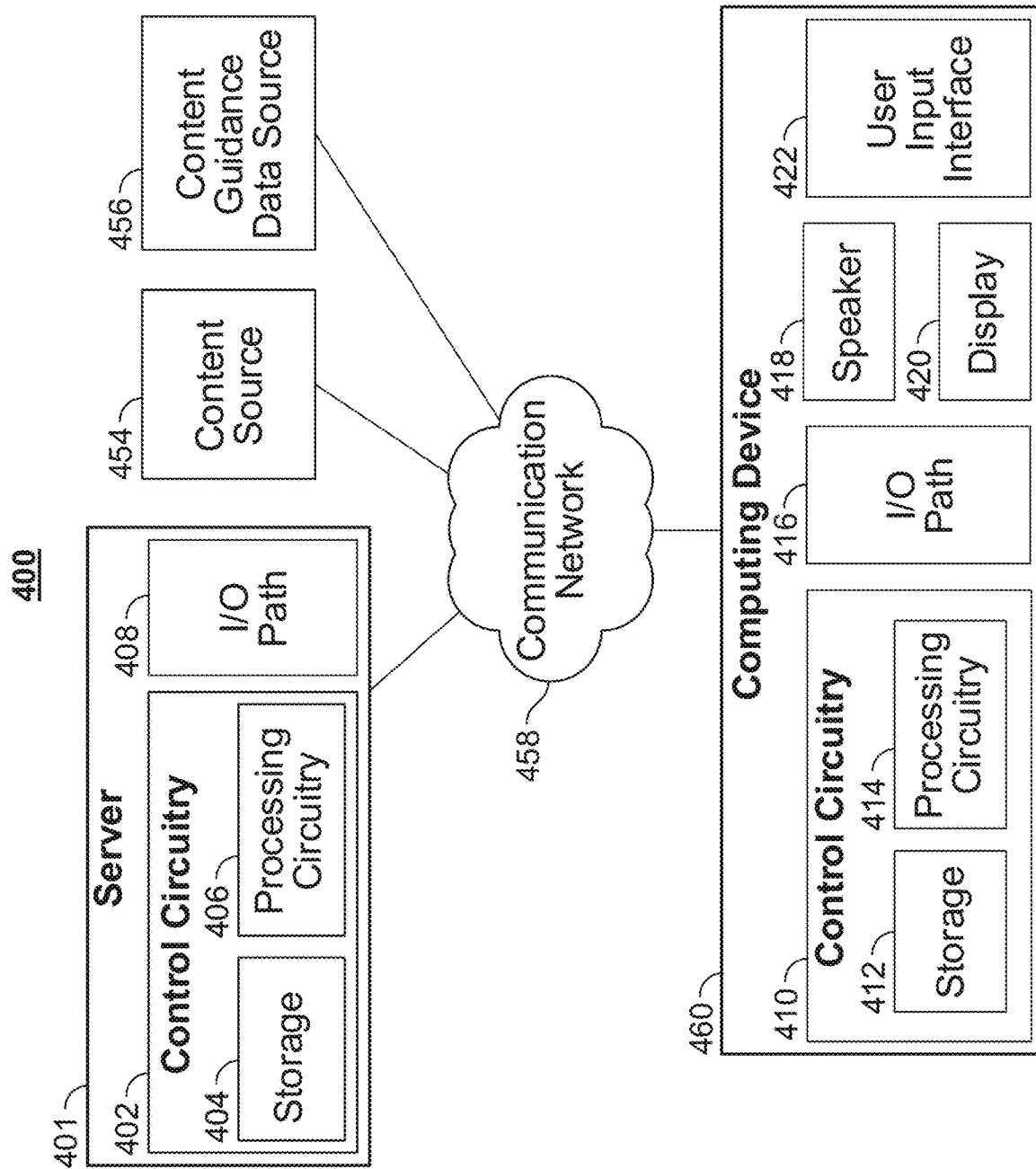
FIG. 4 is an illustrative block diagram showing additional details of a system hosting the content item delivery application, in accordance with some embodiments of the disclosure.

FIG. 4 is an illustrative block diagram showing additional details of the system 400, in accordance with some embodiments of the disclosure. In particular, server 401 (e.g., the same server as server 302) includes control circuitry 402 and an input/output I/O circuitry 408, and control circuitry 402 includes storage 404 and processing circuitry 406. In one embodiment, the storage 404 includes non-transitory storage instructions that when executed by the processing circuitry 406 cause performance of content popularity application as described in FIGS. 1 and 2 above. Computing device 460 (e.g., one or more of devices 310a, 310b, and 310c) includes control circuitry 410, I/O circuitry 416, speaker 418, display 420, and user input interface 422. Control circuitry 410 includes storage 412 and processing circuitry 414. Control circuitry 402 and/or 410 may be based on any suitable processing circuitry such as processing circuitry 406 and/or 414. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 404, storage 412, and/or storages of other components of system 400 (e.g., storages of content item source 454, content item guidance data source 456, and/or the like) may be an electronic storage device. In some embodiments, content item source 454 may be the same as content item source 304. In some embodiments, content item guidance data source 456 may be the same as content item source 306. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 404, storage 412, and/or storages of other components of system 400 may be used to store various types of content, content item guidance data, and or other types of data. Non-volatile memory may also be used (e.g., to launch a boot-up routine and other instructions). Cloud-based storage may be used to supplement storages 404, 412 or instead of storages 404, 412. In some embodiments, control circuitry 402 and/or 410 executes instructions for a content item recommendation application stored in memory (e.g., storage 404 and/or 412). Specifically, control circuitry 402 and/or 410 may be instructed by the content item recommendation application to perform the functions discussed herein. In some implementations, any action performed by control circuitry 402 and/or 410 may be based on instructions received from the content item recommendation application. For example, the content item recommendation application may be implemented as software or a set of executable instructions that may be stored in storage 404 and/or 412 and executed by control circuitry 402 and/or 410. In some embodiments, the content item recommendation application may be a client/server content item recommendation application where only a client content item recommendation application resides on computing device 460, and a server content item recommendation application resides on server 401.

The content item recommendation application may be implemented using any suitable architecture. For example, it may be a stand-alone content item recommendation application wholly implemented on computing device 460. In such an approach, instructions for the content item recommendation application are stored locally (e.g., in storage 412), and data for use by the content item recommendation application is downloaded on a periodic basis (e.g., from an out-of-band feed, from an Internet resource, or using another suitable approach). Control circuitry 410 may retrieve instructions for the content item recommendation application from storage 412 and process the instructions to perform the functionality described herein. Based on the processed instructions, control circuitry 410 may determine what action to perform when input is received from user input interface 422.

In client/server-based embodiments, control circuitry 410 may include communication circuitry suitable for communicating with a content item recommendation application server (e.g., server 401) or other networks or servers. The instructions for carrying out the functionality described herein may be stored on the application server. Communication circuitry may include a cable modem, an integrated service digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 458). In some embodiments, communication network 458 may be the same as network 308. In another example of a client/server-based application, control circuitry 410 runs a web browser that interprets web pages provided by a remote server (e.g., server 401). For example, the remote server may store the instructions for the application in a storage device. The remote server may process the stored instructions using circuitry (e.g., control circuitry 402) and generate the displays discussed above and below. Computing device 460 may receive the displays generated by the remote server and may display the content item of the displays locally via display 420. This way, the processing of the instructions is performed remotely (e.g., by server 401) while the resulting displays, such as the display windows described elsewhere herein, are provided locally on computing device 460. For example, computing device 460 may include display circuitry (e.g., video card circuitry or combination motherboard and video card circuitry) configured to generate for display the display windows. Computing device 460 may receive inputs from the user via input interface 422 and transmit those inputs to the remote server for processing and generating the corresponding displays.

A user may send instructions to control circuitry 402 and/or 410 using user input interface 422. User input interface 422 may be any suitable user interface, such as a remote control, trackball, keypad, keyboard, touchscreen, touchpad, stylus input, joystick, voice recognition interface, or other user input interfaces. User input interface 422 may be integrated with or combined with display 420, which may be a monitor, television, liquid crystal display (LCD), electronic ink display, or any other equipment suitable for displaying visual images.

Server 401 and computing device 460 may receive content item and data via input/output (hereinafter "I/O") circuitries 408 and 416, respectively. Although, I/O circuitries are shown, some embodiments may include I/O paths coupled to the circuitries (e.g., network cards, transceivers etc.) For instance, I/O circuitry 416 is a circuitry that includes one or more of communication port configured to receive a live content item stream from server 401 and/or content item source 454 via a communication network 458. Storage 412 may be configured to buffer the received live content item stream for playback and display 420 may be configured to present the buffered content, navigation options, alerts, and/or the like via a primary display window and/or a secondary display window. I/O circuitries 408, 416 may provide content item (e.g., a live stream of content, broadcast programming, on-demand programming, Internet content, content item available over a local area network (LAN) or wide area network (WAN), and/or other content) and data to control circuitry 402, 410. Control circuitry 402, 410 may be used to send and receive commands, requests, and other suitable data using I/O circuitries 408, 416. I/O circuitries 408, 416 may connect control circuitry 402, 410 (and specifically processing circuitry 406, 414) to one or more communication circuitries (described below). I/O functions may be provided by one or more of these communication circuitries but are shown as single paths in FIG. 4 to avoid overcomplicating the drawing.

Figure 5:
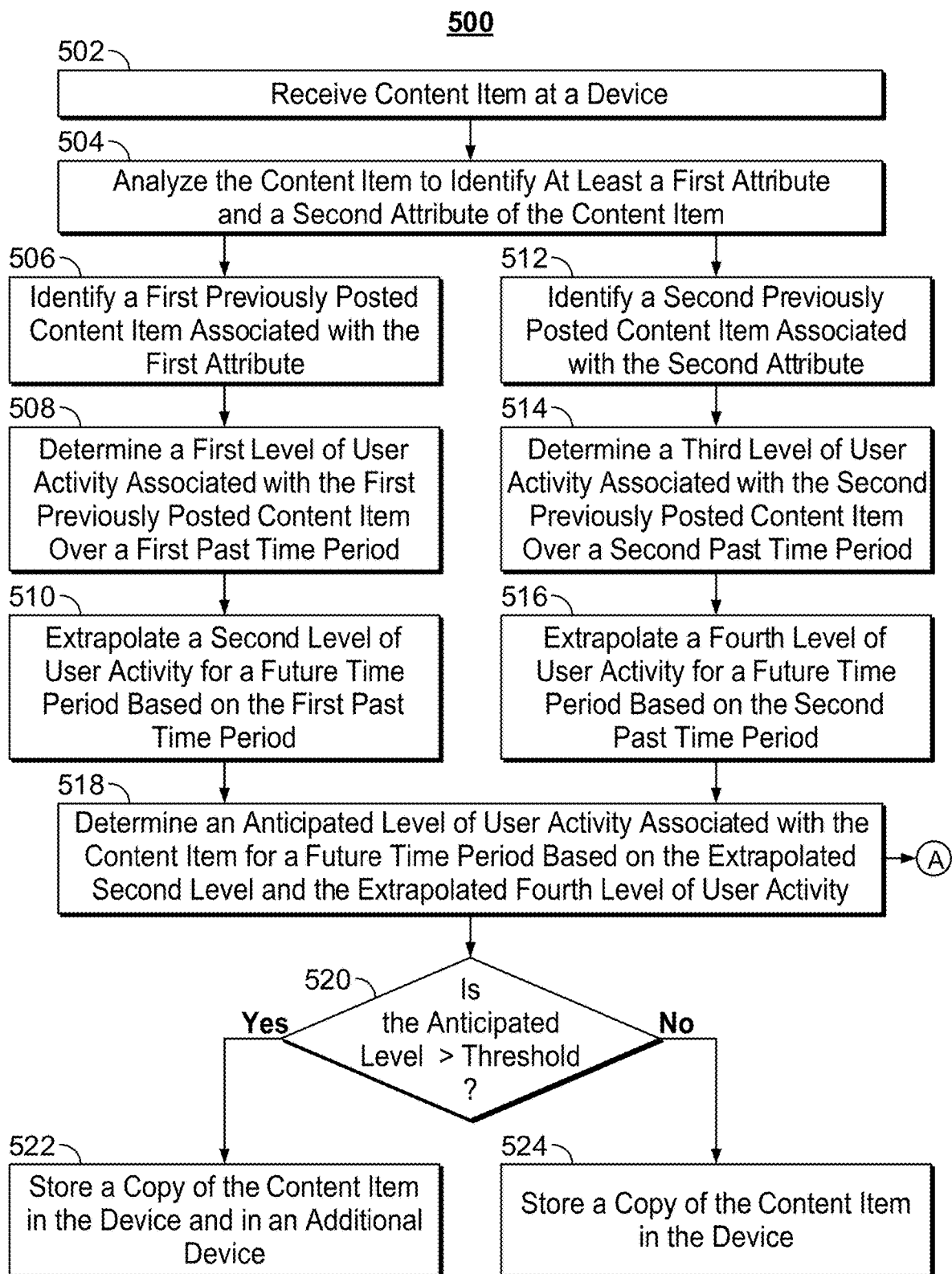
FIG. 5 depicts an illustrative flowchart of a process for determining content item popularity, in accordance with some embodiments of the disclosure.

Having described systems 300 and 400, reference is now made to FIG. 5, which depicts an illustrative flowchart of process 500 for determining content item popularity that may be implemented by using systems 300 and 400, in accordance with some embodiments of the disclosure. In various embodiments, the individual steps of process 500 may be implemented by one or more components of systems 300 and 400. Although the present disclosure may describe certain steps of process 500 (and of other processes described herein) as being implemented by certain components of systems 300 and 400, this is for purposes of illustration only, and it should be understood that other components of systems 300 and 400 may implement those steps instead. For example, steps of process 500 may be executed by server 302 and/or by computing device 460 to provide content item recommendations.

At step 502, I/O circuitry (e.g., I/O circuitry 408 of FIG. 4) receives a content item at a device. In one example, the device is Server 1 as shown in FIG. 1. In one embodiment, the content item includes content item that is newly created by a user (e.g., a user may be attempting to upload the content item to server 401 from device 460 via network 458). In one embodiment, content item includes content item such as media, product, service, news articles etc. Media content item may refer to any kind of video, audio, text, or multimedia content, or any combination thereof. In one embodiment, the I/O circuitry receives the content item via an API from a server (e.g., server 401) or from a media content item guidance data source (e.g., content item guidance data source 456). For example, I/O circuitry may access a screen (e.g., provide input for the algorithms) or database and receive content items via communications network (e.g., network 458). In one embodiment, the server 401 may store the content items locally in storage 401

At 504, control circuitry analyzes the content item to identify at least a first attribute and a second attribute with the content item. As discussed above, first and second attributes include a first category and a second category respectively of the content item. In one embodiment, the content popularity application determines the first and the second attributes based on metadata associated with the content item. The metadata may include but is not limited to theme, genre, characters, locations, sports, events, holidays, celebrations, activities, occupations etc. In one embodiment, the content popularity application determines the first and the second attributes of the content item based on visual content item associated with the content item. The visual content item may include but not limited to pictures, videos, screenshots, memes, slide decks, graphics, diagrams, charts etc. In one example, the first attribute is identified as "Halloween" and the second attribute is identified as "Celebrity." At 506, the control circuitry 402 identifies a first previously posted content item associated with the first attribute. In one embodiment, a first previously posted content item is identified from a plurality of previously posted media content items stored in a database (e.g., 132 in FIG. 1). In one example, the first previously posted content item is Halloween related content.

At step 508, the control circuitry 402 determines a first level of user activity associated with the first previously posted content item over a first past time period. In one example, the first user activity includes number of likes, shares, dislikes, shares, ratings and comments (e.g., positive, negative, neutral) etc. In one example, the first level of user activity for the Halloween related content item is determined to be low for January to September during the years 2017, 2018, 2019 and 2020, high during the month of October during the years 2017, 2018, 2019 and 2020, and low for the months of November and December during the years 2017, 2018 and 2020. At step 510, the control circuitry 402, extrapolates a second level of user activity for a future time period based on the first past time period. In one example, the second level of user activity is predicted to drop after the month of October 2020.

At 512, the control circuitry 402 identifies a second previously posted content item associated with a second attribute. In one embodiment, a second previously posted content item is identified from a plurality of previously posted media content items stored in a database (e.g., 132 in FIG. 1). In one example, the second previously posted content item is Celebrity related content. At step 514, the control circuitry 402 determines a third level of user activity associated with the second previously posed content item over a second past time period. In one example, the third level of user activity is determined to be rising from September to December in the year 2018, dropping during the months of January to July in the year 2019, then rising again from August to December of 2019, then dropping from months of January to August 2020, then began rising from month of September 2020. At step 516, the control circuitry 402, extrapolates a fourth level of user activity for a future time period based on the second past time period. In one example, the fourth level of user activity is predicted to continue to rise during the month of October till at least the month of December 2020. In one embodiment, the control circuitry 402 executes steps 512, 514 and 516 simultaneously with 506, 508 and 510 respectively.

At step 518, the control circuitry 402, determines an anticipated level of user activity associated with the content item for a future time period based on the extrapolated second level of user activity and extrapolated fourth level of user activity. In one example, the anticipated level of user activity for the content item is anticipated be very high during the month of October 2020. At step 520, the control circuitry 402 determines whether the anticipated level of user activity is greater than a threshold. In one example, a threshold is based on a number of user activity level such as number of likes, number of shares, number of comments or any combination of two or more of such activity level. In one example, threshold is based on number of types of comments such as positive or negative comments. If at step 520, it is determined that the anticipated level of user activity is greater than the threshold, then at step 522, the control circuitry 402 stores a copy of the content item in the device and in an additional device. Thus, by storing the content item in two or more devices, the content item is distributed spatially relative to end users. The device is the same as the device at which the content item is received. In one embodiment, the device and the additional devices are two separate devices. If at step 520, it is determined that the anticipated level of user activity is less than the threshold, then at step 522, the control circuitry 402 stores a copy of the content item only in the device.

In some embodiments, the control circuitry 402 recommends to a user device from which the content item was received, to upload the content item on one or more social media platforms. In one embodiment, the control circuitry 402 may determine a number of social media platforms to upload the content item based on the determination whether the anticipated level of user activity is greater than the threshold. For example, when the anticipated level of user activity is determined to be greater than the threshold, the control circuitry 402 may recommend to the user device to upload the content item in multiple social media platforms. When the anticipated level of user activity is determined to be less than the threshold, the control circuitry 402 may recommend to the user device to upload the content item in only one social media platform. In some embodiments, the control circuitry 410 may suggest to the user device to edit or modify the content item based on the determined anticipated level of user activity. In one embodiment, the control circuitry 410 may suggest to the user device to edit or modify the content item prior to uploading the content item on one or more social media platforms.

Figure 6:
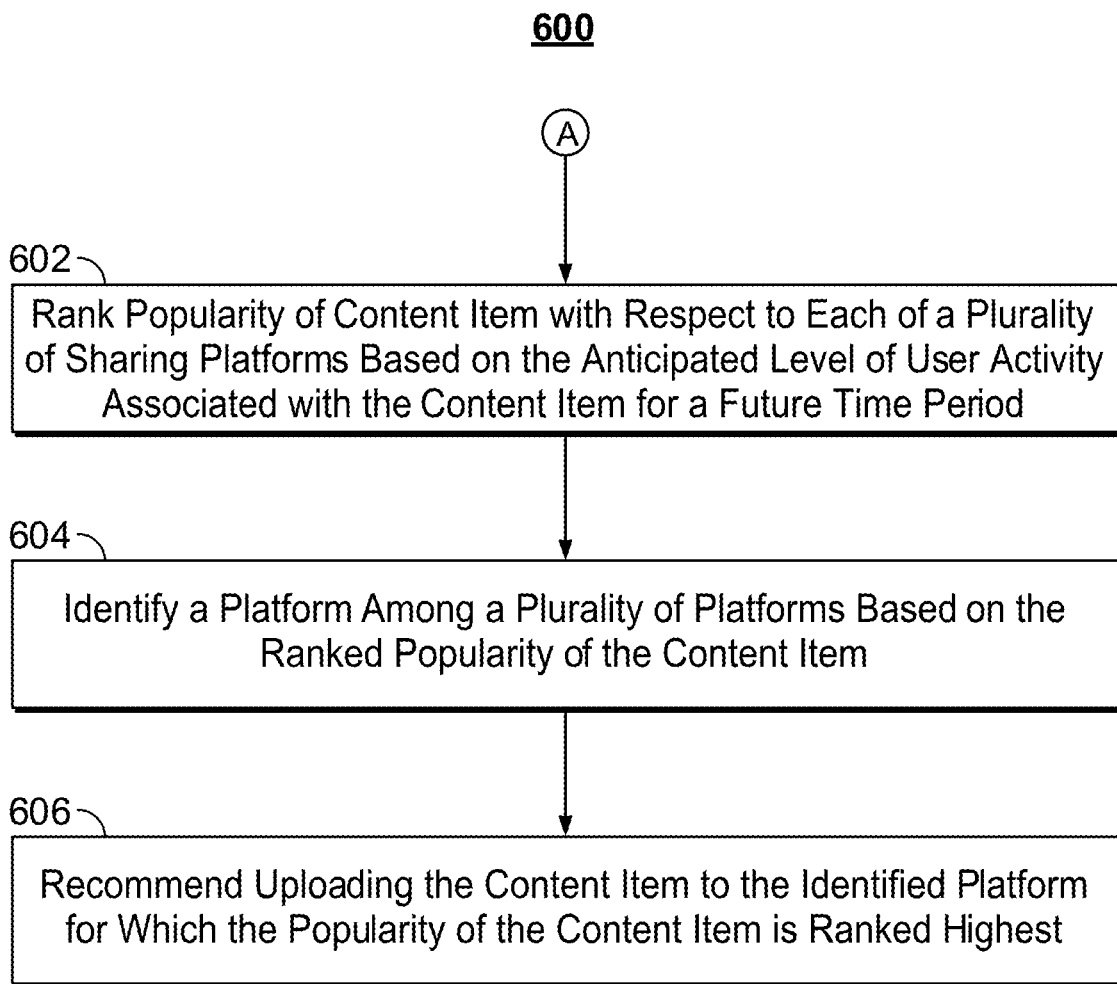
FIG. 6 depicts an illustrative flowchart of a process for determining platform to upload content, in accordance with some embodiments of the disclosure.

FIG. 6 depicts an illustrative flowchart of process 600 for recommending a platform to upload the newly created content item that may be implemented by using systems 300 and 400, in accordance with some embodiments of the disclosure. In various embodiments, individual steps of process 600 may be implemented by one or more components of systems 300 and 400. Although the present disclosure may describe certain steps of process 600 (and of other processes described herein) as being implemented by certain components of systems 300 and 400, this is for purposes of illustration only, and it should be understood that other components of systems 300 and 400 may implement those steps instead. For example, steps of process 600 may be executed by server 302 and/or by computing device 460 to store the content item. In some embodiments, control circuitry 410 may use process 600 as part of process 500 of FIG. 5 (e.g., in addition to steps 502-518).

At step 602, the control circuitry 410 ranks popularity of the content item with respect to each of a plurality of sharing platforms based on the anticipated level of user activity associated with the content item for a future time period. In one example, the popularity of the content item is ranked high in one or more of the plurality of sharing platforms. In another example, the popularity of the content item is ranked medium in one or more of the plurality of sharing platforms. In a further example, the popularity of the content item is ranked low in one or more of the plurality of sharing platforms. At step 604, the control circuitry 410 identifies a platform among a plurality of platforms based on the ranked popularity of the content item. In one example, the control circuitry 410 identifies Facebook as the sharing platform in which the popularity of the content item is ranked high. In another example, the control circuitry 410 identifies Instagram as the platform in which the popularity of the content item is ranked medium. In a further example, the control circuitry 410 identifies Snapchat as the platform where the popularity of the content item is ranked low. At step 606, the control circuitry 410 recommends uploading the content item to the identified platform for which the popularity of the content item is ranked highest. In one example, the control circuitry 410 identifies Facebook as the sharing platform to upload the content item since the popularity of the content item is detected to be high in Facebook in the future time period.

The above-described embodiments of the present disclosure are presented for purposes of illustration and not of limitation, and the present disclosure is limited only by the claims that follow. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
receiving a request to upload a first content item from a first device to at least one sharing platform;
determining an anticipated level of user activity associated with the first content item over a future time period on a sharing platform of the at least one sharing platform based on consumption data of a first plurality of content items by a plurality of devices;
comparing the determined anticipated level of user activity to a threshold user activity value;
determining based on the comparing that the determined anticipated level is above the threshold user activity value; and
based at least in part on the determining: transmitting a recommendation to the first device to upload the first content item to the sharing platform of the at least one sharing platform.

2. The method of claim 1, wherein the sharing platform is a social media platform.

3. The method of claim 1, wherein the consumption data comprises one or more of clicks, views, likes, dislikes, shares, ratings and comments.

4. The method of claim 1, wherein the determining the anticipated level of user activity associated with the first content item further comprises:
   analyzing the first content item based on metadata associated with the first content item.

5. The method of claim 1, wherein the determining the anticipated level of user activity associated with the first content item further comprises:
   analyzing the first content item based on visual content item associated with the first content item.

6. The method of claim 1, wherein the determining the anticipated level of user activity further comprises:
   retrieving a location of the first device;
   determining a popularity rating for the sharing platform, wherein the popularity rating is based on a usage level of the sharing platform near the location;
   in response to determining that the popularity rating is lower than a threshold popularity rating, decreasing the anticipated level of user activity for the sharing platform.

7. The method of claim 1, wherein the determining of the anticipated level of user activity further comprises:
   determining an anticipated popularity level for the sharing platform;
   in response to determining that the anticipated popularity level for the sharing platform is lower than a threshold popularity level, decreasing the anticipated level of user activity for the sharing platform.

8. The method of claim 1, further comprising:
   receiving a request to upload a second content item from a second device to the at least one sharing platform;
   determining an anticipated level of user activity associated with the second content item over the future period on the sharing platform of the at least one sharing platform based on the consumption data of a second plurality of content items by the plurality of devices;
   comparing the determined anticipated level of user activity associated with the second content item to the threshold user activity value;
   determining based on the comparing that the determined anticipated level of user activity associated with the second content item is above the threshold user activity value; and
   transmitting a recommendation to the second device to modify the second content item based on the determined anticipated level of user activity.

9. The method of claim 1, further comprising:
   in response to determining that the anticipated level of user activity associated with the first content item for the future time period is above the threshold user activity value:
   storing a copy of the first content item at the first device and at an additional device such that the first content item is available to a plurality of users via the first device and via the additional device, wherein the additional device is different from the first device.

10. A system comprising:
    input/output circuitry configured to:
       receive a request to upload a first content item from a first device to at least one sharing platform;
    control circuitry configured to:
       determine an anticipated level of user activity associated with the first content item over a future time period on a sharing platform of the at least one sharing platform based on consumption data of a first plurality of content items by a plurality of devices;
       compare the determined anticipated level of user activity to a threshold user activity value;
       determine based on the comparing that the determined anticipated level is above the threshold user activity value; and
       based at least in part on the determining: transmit a recommendation to the first device to upload the first content item to the sharing platform of the at least one sharing platform.

11. The system of claim 10, wherein the sharing platform is a social media platform.

12. The system of claim 10, wherein the consumption data comprises one or more of clicks, views, likes, dislikes, shares, ratings and comments.

13. The system of claim 10, wherein the control circuitry configured to determine the anticipated level of user activity associated with the first content item is further configured to:
    analyze the first content item based on metadata associated with the first content item.

14. The system of claim 10, wherein the control circuitry configured to determine the anticipated level of user activity associated with the first content item is further configured to:
    analyze the first content item based on visual content item associated with the first content item.

15. The system of claim 10, wherein the control circuitry configured to determine of the anticipated level of user activity is further configured to:
    retrieve a location of the first device;
    determine a popularity rating for the sharing platform, wherein the popularity rating is based on a usage level of the sharing platform near the location;
    in response to determining that the popularity rating is lower than a threshold popularity rating, decrease the anticipated level of user activity for the sharing platform.

16. The system of claim 10, wherein the control circuitry configured to determine the anticipated level of user activity is further configured to:
    determine an anticipated popularity level for the sharing platform;
    in response to determining that the anticipated popularity level for the sharing platform is lower than a threshold popularity level, decrease the anticipated level of user activity for the sharing platform.

17. The system of claim 10, wherein:
    the input/output circuitry is further configured to:
       receive a request to upload a second content item from a second device to the at least one sharing platform;
    the control circuitry is further configured to:
       determine an anticipated level of user activity associated with the second content item over the future period on the sharing platform of the at least one sharing platform based on the consumption data of a second plurality of content items by the plurality of devices;
       compare the determined anticipated level of user activity associated with the second content item to the threshold user activity value;
       determine based on the comparing that the determined anticipated level of user activity associated with the second content item is above the threshold user activity value; and transmit a recommendation to the first device to modify the first content item based on the determined anticipated level of user activity.

18. The system of claim 10, wherein the control circuitry is further configured to:
in response to determining that the anticipated level of user activity associated with the first content item for the future time period is above the threshold user activity value:
store a copy of the first content item at the first device and at an additional device such that the first content item is available to a plurality of users via the first device and via the additional device, wherein the additional device is different from the first device.

* * * * *